(12) United States Patent
Suzuki et al.

(10) Patent No.: US 7,509,009 B2
(45) Date of Patent: Mar. 24, 2009

(54) OPTICAL FIBER STRUCTURE AND METHOD OF MANUFACTURING SAME

(75) Inventors: Masayoshi Suzuki, Shizuoka (JP); Kyoichi Sasaki, Shizuoka (JP); Ken Sukegawa, Shizuoka (JP)

(73) Assignee: Tomoegawa Paper Co., Ltd, Tokyo (JP)

( * ) Notice: Subject to any disclaimer, the term of this patent is extended or adjusted under 35 U.S.C. 154(b) by 0 days.

(21) Appl. No.: 11/372,472

(22) Filed: Mar. 9, 2006

(65) Prior Publication Data
US 2007/0081774 A1    Apr. 12, 2007

(30) Foreign Application Priority Data

| Mar. 23, 2005 | (JP) | ............................. 2005-082922 |
| Mar. 23, 2005 | (JP) | ............................. 2005-082923 |
| Mar. 29, 2005 | (JP) | ............................. 2005-094177 |

(51) Int. Cl.
*G02B 6/44* (2006.01)
*G02B 6/04* (2006.01)

(52) U.S. Cl. ..................... 385/114; 385/100; 385/106; 385/108; 385/120

(58) Field of Classification Search ................ 385/114, 385/100, 108
See application file for complete search history.

(56) References Cited

U.S. PATENT DOCUMENTS

| 5,155,785 | A   |    | 10/1992 | Holland et al.      |
| 6,483,972 | B1  |    | 11/2002 | Thompson et al.     |
| 6,498,882 | B1  |    | 12/2002 | Buckelew et al.     |
| 6,519,398 | B2  | *  | 2/2003  | Hwang ........................ 385/114 |
| 6,628,866 | B1  | *  | 9/2003  | Wilson et al. ................ 385/114 |
| 6,839,475 | B2  |    | 1/2005  | Kawase et al.       |
| 6,937,808 | B2  |    | 8/2005  | Kawase et al.       |
| 7,139,456 | B2  | *  | 11/2006 | Sasaki et al. ................ 385/114 |

(Continued)

FOREIGN PATENT DOCUMENTS

CN    2370431 Y    3/2000

(Continued)

OTHER PUBLICATIONS

Chinese Office Action issued on Jun. 6, 2008 in Chinese Application No. 01115866.2, (Publication No. 200610065489.6).

(Continued)

*Primary Examiner*—Michelle R Connelly Cushwa
*Assistant Examiner*—Rhonda S Peace
(74) *Attorney, Agent, or Firm*—Knobbe Martens Olson & Bear LLP

(57) ABSTRACT

The present invention provides an optical fiber structure that allows for reliable and easy branching of optical fibers, as well as a method of manufacturing such optical fiber structure. The optical fiber structure proposed by the present invention is characterized by a structure wherein multiple optical fiber units, each comprising multiple optical fibers that are aligned two-dimensionally in such a way that one side is covered by a first covering body, are aligned so that the covered surfaces face the same direction, and the covered or uncovered surfaces of the multiple optical fiber units are integrally covered by a second covering body. The second covering body should preferably be made of silicone rubber having a tearing strength of 29 kgf/cm or below.

20 Claims, 11 Drawing Sheets

U.S. PATENT DOCUMENTS

| | | |
|---|---|---|
| 7,286,737 B2 | 10/2007 | Suzuki et al. |
| 2002/0122641 A1* | 9/2002 | Nakaya ............... 385/114 |
| 2002/0197033 A1* | 12/2002 | Patel .................. 385/114 |
| 2003/0044141 A1* | 3/2003 | Melton et al. ......... 385/114 |
| 2003/0053772 A1* | 3/2003 | Ikunishi et al. ....... 385/114 |
| 2003/0138646 A1* | 7/2003 | Meguriya et al. ...... 428/477 |
| 2003/0198446 A1 | 10/2003 | Sun et al. |
| 2004/0131319 A1* | 7/2004 | Fournier et al. ....... 385/114 |
| 2004/0213505 A1 | 10/2004 | Saito et al. |
| 2004/0240812 A1 | 12/2004 | Sun et al. |
| 2005/0117859 A1* | 6/2005 | Suzuki et al. ......... 385/114 |

FOREIGN PATENT DOCUMENTS

| | | |
|---|---|---|
| CN | 1316656 A | 10/2001 |
| CN | 1549944 | 11/2004 |
| EP | 0 764 863 A1 | 3/1997 |
| EP | 1 361 464 A2 | 11/2003 |
| EP | 1 376 165 | 1/2004 |
| JP | 06-123826 | 5/1994 |
| JP | 06186462 | 7/1994 |
| JP | 07-134230 | 5/1995 |
| JP | 07-230021 | 8/1995 |
| JP | 2002-174759 | 6/2002 |
| JP | 2002-189153 | 7/2002 |
| JP | 2002-228898 | 8/2002 |
| JP | 2002-341205 | 11/2002 |
| JP | 2003-066296 | 3/2003 |
| JP | 2004-45937 | 2/2004 |
| KR | 2000-45498 | 7/2000 |
| WO | WO 2004/008215 | 1/2004 |

OTHER PUBLICATIONS

English Translation of Chinese Office Action issued on Jun. 6, 2008 in Chinese Application No. 01115866.2, (Publication No. 200610065489.6).

* cited by examiner

OPTICAL FIBER STRUCTURE AND METHOD OF MANUFACTURING SAME

BACKGROUND OF THE INVENTION

1. Field of the Invention

The present invention relates to an optical fiber structure that combines multiple optical fibers and is used for optical circuit packages, optical circuit devices and other applications pertaining to optical communication and optical information processing, as well as a method of manufacturing the same.

2. Description of the Related Art

An optical fiber structure is constituted by multiple optical fibers that are aligned and affixed to each other, and has the advantage of providing the smallest configuration for optical fiber core wiring. Traditionally, coated optical fiber ribbons have often been used as such optical fiber structures. For example, coated optical fiber ribbons are used to store multiple optical fibers in an optical fiber cable in a compact and dense manner, and they are also utilized for multi-core wiring of optical fibers between devices or within a single device.

As the conversion of communication lines to optical fibers progresses, even to the last mile, it has become necessary to branch multi-core coated optical fiber ribbons and connect them to individual subscribers. To do this, coated optical fiber ribbons must be split and branched into single optical fibers on site, or otherwise coated optical fiber ribbons having branching sections at desired positions are required. In general, a method of manually splitting coated optical fiber ribbons or achieving the same effect mechanically by means of a simple jig is used to produce branching sections, both during manufacturing and on-site connection. However, the process of splitting coated optical fiber ribbon manually or mechanically using a jig presents several problems, such as the need for a large force to split the optical fibers, generation of an excessive stress received by the optical fibers at the time of splitting, and easy occurrence of unnecessary splitting. To improve these problems, improved structures such as double-cover structures for splittable coated optical fiber ribbons (Japanese Patent Laid-open Nos. Hei 7-134230 and 2002-174759) and a method involving the use of a connection resin offering high peelability between optical fibers (Japanese Patent Laid-open No. 2002-189153) have been proposed, among others. However, practical splittable coated optical fiber ribbons have not been provided so far. Also, the method involving the use of a connection resin offering high peelability presents a new set of problems, such as contamination of surroundings and consequent interference with the connection process due to remnants of the connection resin layer peeling off at the time of splitting.

Also, a method of manufacturing an optical fiber structure by aligning multiple optical fibers in parallel, covering these optical fibers, and then creating an integrated bundle of multiple optical fibers, is also known (Japanese Patent Laid-open No. Hei 6-123826). Under this conventional manufacturing method, however, positioning and application jigs are required that are appropriate for the number of optical fibers in the optical fiber structure as well as the optical fiber pitch. In the case of an optical fiber structure having a specific number of optical fibers and/or specific optical fiber pitch, therefore, a specific manufacturing apparatus prepared exclusively for the applicable conditions must be used to manufacture the optical fiber structure or the existing application jig must be replaced with a specific jig, which prevents efficient manufacture of an optical fiber structure having a desired number of optical fibers.

SUMMARY OF THE INVENTION

The present invention aims to solve the aforementioned problems inherent in the prior art. Specifically, an object of the present invention is to provide an optical fiber structure that allows for reliable and easy branching of optical fibers, or an optical fiber structure comprising branched optical fibers, as well as a method of easily manufacturing such optical fiber structure.

The optical fiber structure proposed by the present invention is characterized by the structure wherein multiple optical fiber units, each comprising multiple optical fibers that are aligned two-dimensionally in such a way that one side is covered by a first covering body, are aligned so that the covered surfaces face the same direction, and the covered or uncovered surfaces of the multiple optical fiber units are integrally covered by a second covering body.

The optical fiber structure proposed by the present invention may have the alignment order of optical fiber units changed in a desired manner. Also, the optical fiber structure may have the alignment order of optical fibers changed in each of the optical fiber units. Furthermore, the optical fiber structure may have at least one branching structure where at least one of the multiple optical fiber units is branched. In this case, it is desirable that the branching structure be affixed by means of an affixing member.

In the optical fiber structure proposed by the present invention, the second covering body used to cover the multiple optical fiber units should preferably have a tearing strength of 29 kgf/cm or below, and preferably be made of silicone rubber. In addition, preferably the first covering body should also be made of silicone rubber. Furthermore, the first covering body and second covering body should preferably be made of the same material.

The optical fiber structure proposed by the present invention may also have on its end a group of single optical fibers comprising branched single optical fibers from optical fibers. In this case, each branched single optical fiber may be guided through a separate cylindrical tube.

A method of manufacturing optical fiber structure as proposed by the present invention is characterized by comprising: a step in which multiple optical fiber units, each comprising multiple optical fibers that are aligned and placed on a plane in such a way that one side is covered by a first covering body, are aligned so that the covered surfaces face the same direction; and a step in which the covered or uncovered surfaces of the multiple optical fiber units are covered by a second covering body to integrate the multiple optical fiber units.

In the method of manufacturing optical fiber structure proposed by the present invention, the multiple optical fiber units may be placed with its alignment order changed, in the aforementioned step in which multiple optical fiber units are aligned and placed so that the covered surfaces face the same direction, in order to have the multiple optical fiber units at least partially crossed. Or, the multiple optical fibers may be aligned in a different alignment order by causing them to partially cross, in one or more of the optical fiber units. It is also possible to have some of the multiple optical fiber units branched after the uncovered surfaces of the multiple optical fiber units have been covered by the second covering body. Furthermore, some of the multiple optical fiber units can be torn and split, and then the branching sections of the branched optical fiber units can be affixed by means of an affixing member.

DESCRIPTION OF THE SYMBOLS

Figure 1:
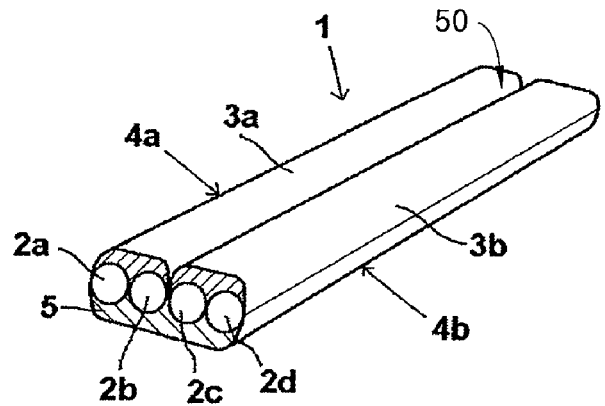
FIG. 1 provides a perspective view of one example of the optical fiber structure proposed by the present invention.

1—Optical fiber structure, 2, 2a to 2d—Optical fiber, 3, 3a to 3f—First covering body, 3'—Covering material, 4, 4a, 4b—Optical fiber unit, 5—Second covering body, 5'—Covering material, 6—Board, 7—Adhesive sheet, 8—Resin, 9—Affixing member, 10—Forming jig, 11—Single-axis control robot, 12—Ball screw shaft, 13—Drive motor, 14—Bearing, 15—Movable unit, 16—Needle, 17—Rubber tube, 20—Material feeding apparatus, 21—Adhesive tape, 22—Application start position, 23—Application end position, 29—Alignment member, 30—Cylindrical tube, 31—Binding member

EFFECT OF THE INVENTION

In the optical fiber structure proposed by the present invention, multiple optical fiber units, each comprising multiple optical fibers that are aligned two-dimensionally in such a way that one side is covered by the first covering body, are aligned so that the covered surfaces face the same direction, and if the uncovered surfaces of these multiple optical fiber units are covered by the second covering body, the optical fiber units can be easily branched into individual units simply by splitting the optical fiber structure to branch the optical fibers by tearing the second covering body. This way, the splitting position can be identified very easily, and since the part to be torn is covered only with a single layer, the required tearing force can be minimized. Also, the optical fiber structure proposed by the present invention permits the optical fibers to be split within each optical fiber unit even after the second covering body has been torn, which facilitates the process of splitting optical fibers in the optical fiber unit. In addition, the optical fiber structure proposed by the present invention does not cause remnants of covering bodies to drop during the splitting process, thereby preventing such remnants from interfering with the connection process.

Furthermore, the method of manufacturing optical fiber structure proposed by the present invention allows for manufacture of an optical fiber structure by means of aligning and coating optical fibers and optical fiber units on a plane, without having to replace the application jig or using a special positioning jig, etc., as is the case under conventional manufacturing methods, whenever the number of optical fibers increases or decrease or other specification change occurs. Therefore, an optical fiber structure having a desired number of optical fibers can be manufactured simply and efficiently and the manufacturing cost can also be reduced. Also according to the method of manufacturing optical fiber structure proposed by the present invention, an optical fiber unit in which the alignment order of optical fibers is changed in a desired manner, with some optical fibers crossed, can be produced easily. Therefore, an optical fiber unit having optical fibers that have been wired in accordance with the I/O ports of the applicable device can be selectively used, and the efficiency of connecting optical fibers in accordance with the device I/O ports also improves significantly.

The optical fiber structure obtained by the manufacturing method proposed by the present invention can have the first covering body and second covering body adjusted to a uniform thickness and also provides excellent flexibility. Therefore, it can be used in practical applications such as wiring between devices.

DETAILED DESCRIPTION OF THE PREFERRED EMBODIMENT

Embodiments of the optical fiber structure proposed by the present invention are explained below using drawings. In the present invention, "alignment" of optical fibers or optical fiber units means arranging and placing each optical fiber or each optical fiber unit in a desired position, where each adjacent pair of optical fibers may not have an equal distance or may cross with each other. Also, "aligned two-dimensionally" means arranging the target objects by placing them on a plane, and includes cases where optical fibers or optical fiber units are placed in a manner crossing with each other.

The first embodiment of the optical fiber structure proposed by the present invention has multiple optical fiber core wires aligned in parallel. FIG. 1 provides a perspective view of one example of this embodiment. In FIG. 1, the optical fiber structure is formed by two two-core optical fiber units, each comprising two optical fiber core wires. In FIG. 1, an optical fiber structure 1 is formed by an optical fiber unit 4a comprising aligned optical fiber core wires 2a and 2b, and an optical fiber unit 4b comprising aligned optical fibers 2c and 2d, where one side of the aligned optical fiber core wires of the optical fiber unit 4a is covered by a first covering body 3a, while one side of the aligned optical fiber core wires of the optical fiber unit 4b is also covered by a first covering body 3b. A groove 50 separates first covering body 3a and the first covering body 3b. These optical fiber units 4a and 4b are aligned in such a way that the covered surfaces face the same direction (top direction in the figure), while the surfaces not covered by the first covering body are integrally covered by a second covering body 5.

Figure 2A:
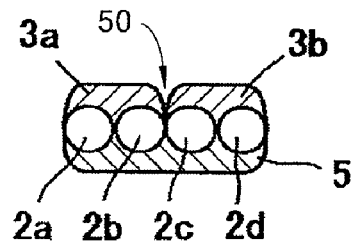
FIGS. 2A through 2C respectively provide section views of one example of the optical fiber structure proposed by the present invention.
Figure 2B:
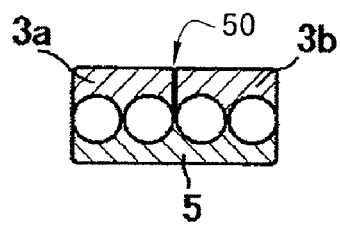
Figure 2C:
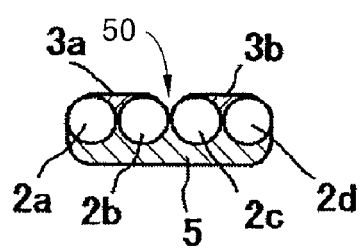

FIGS. 2A through 2C provide sectional views of an optical fiber structure having a similar structure to the one illustrated in FIG. 1, showing the various covering patterns of the first covering body over the optical fiber units. It is sufficient that the first covering body, which covers one side of the aligned multiple optical fiber core wires of each optical fiber unit, affixes the optical fiber core wires by means of covering. The representative covering pattern is one having the section structure shown in FIG. 2A, wherein a groove 50 is formed between the first covering body 3a and first covering body 3b. However, covering may be formed as shown in FIG. 2B, where the first covering bodies 3a and 3b of the two optical fiber units contact with each other comprising a groove 50 between them. Also, covering may be formed as shown in FIG. 2C, where the first covering bodies 3a and 3b cover the optical fiber core wires up to the tangential line common to the two circles defining the outer profiles of the two pairs of optical fiber core wires 2a and 2b, and 2c and 2d, constituting the respective optical fiber units.

Figure 3:
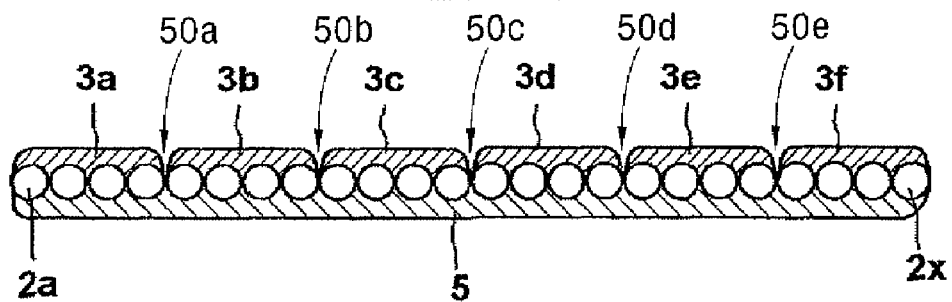
FIG. 3 provides a section view of another example of the optical fiber structure proposed by the present invention.

FIG. 3 provides a section view of an optical fiber structure where six optical fiber units, each comprising four optical fiber core wires having one side covered by the first covering body, are aligned and then the uncovered surfaces are integrally covered by the second covering body. Numerals 2a and 2x indicate optical fiber core wires, 3a to 3f indicate first covering bodies, while 5 indicates a second covering body. Reference numerals 50a to 50e illustrate the grooves between the first covering bodies 3a to 3f.

Figure 4:
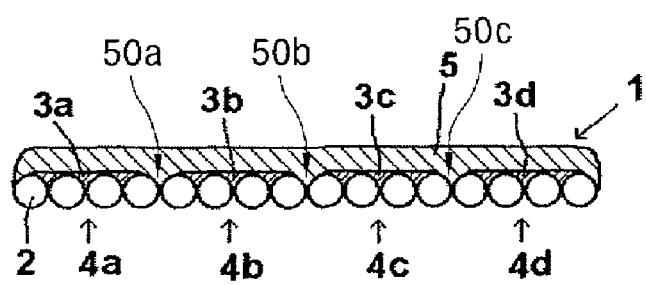
FIG. 4 provides a section view of another example of the optical fiber structure proposed by the present invention.

FIG. 4 illustrates another example of the first embodiment of the optical fiber structure proposed by the present invention, providing a section view of an optical fiber structure having the second covering body provided over the surfaces covered by the first covering body. In this figure, four optical fiber units 4a-4d, each comprising four optical fiber core wires 2, are aligned so that the covered surfaces face the same direction, and the second covering body 5 is provided over the first covering bodies 3a-3d and the grooves 50a to 50c between the first covering bodies 3a-3d.

Figure 5A:
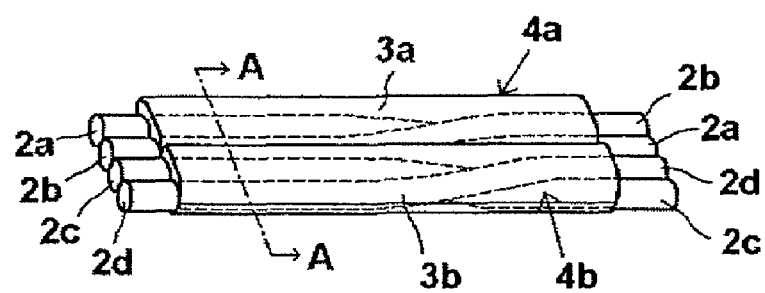
FIG. 5A provides a perspective view of another example of the optical fiber structure proposed by the present invention, while FIG. 5B provides a section view of the same example.
Figure 5B:
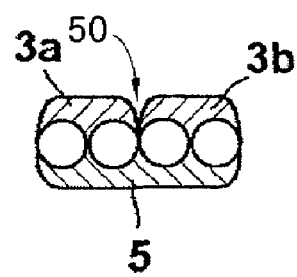

The second embodiment of the optical fiber structure proposed by the present invention has the alignment order of optical fibers changed in each optical fiber unit. FIGS. 5A and 5B show one example of this embodiment, where FIG. 5A provides a perspective view, while FIG. 5B provides a section view of A-A. In FIG. 5A, the optical fiber structure comprises two two-core optical fiber units 4a and 4b, with each optical fiber unit 4a or 4b comprising an optical fiber alignment part where two optical fibers 2a and 2b or 2c and 2d are aligned in parallel, as well as an optical fiber rewiring part where the optical fibers are crossed to rearrange the wiring, where one side (top surface in the figure) of the unit is covered by the first covering body 3a or 3b. These two optical fiber units are aligned and placed and covered integrally by the second covering body 5 over the other side (bottom surface in the figure). In FIGS. 5A and 5B, each of the two optical fiber units has the alignment order of its optical fibers changed. Under the present invention, however, the alignment order of optical fibers may be changed in only one optical fiber unit.

Figure 6A:
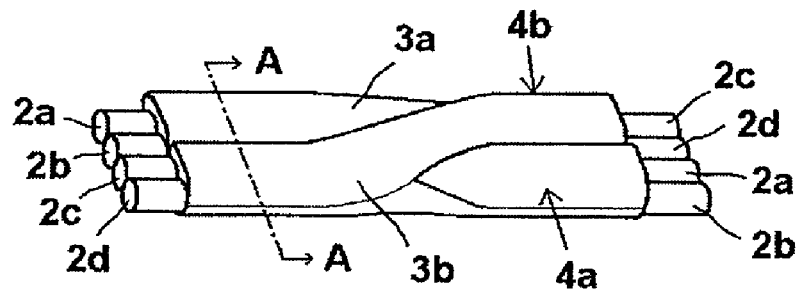
FIG. 6A provides a perspective view of another example of the optical fiber structure proposed by the present invention, while FIG. 6B provides a section view of the same example.
Figure 6B:
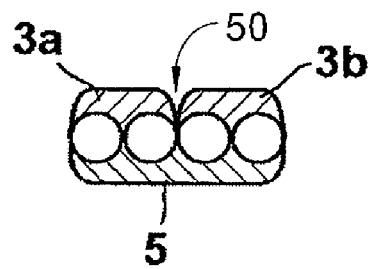

The third embodiment of the optical fiber structure proposed by the present invention has the alignment order of optical fiber units changed. FIGS. 6A and 6B show one example of this embodiment, where FIG. 6A provides a perspective view, while FIG. 6B provides a section view of A-A. In FIGS. 6A and 6B, the optical fiber structure comprising two two-core optical fiber units 4a and 4b, with each optical fiber unit 4a or 4b comprising two optical fibers 2a and 2b or 2c and 2d aligned in parallel, where one side (top surface in the figure) of the unit is covered by the first covering body 3a or 3b and the two optical fiber units cross with each other to change the alignment order. The other side (bottom surface in the figure) of each aligned optical fiber is integrally covered by the second covering body 5.

Figure 7A:
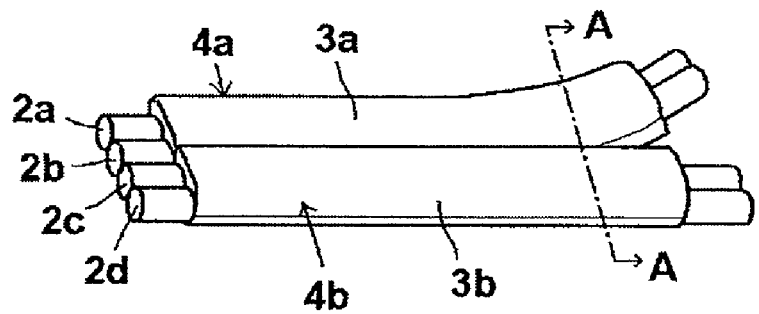
FIG. 7A provides a perspective view of another example of the optical fiber structure proposed by the present invention, while FIG. 7B provides a section view of the same example.
Figure 7B:
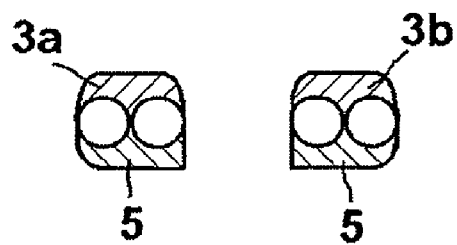

The fourth embodiment of the optical fiber structure proposed by the present invention provides a fan-out optical fiber structure having a branching structure where the multiple optical fiber units are partially branched. FIGS. 7A and 7B show one example of this embodiment, where FIG. 7A provides a perspective view, while FIG. 7B provides a section view of A-A. In FIGS. 7A and 7B, the optical fiber structure is formed by two two-core optical fiber units 4a and 4b, with each optical fiber unit 4a or 4b comprising two optical fibers 2a and 2b or 2c and 2d aligned in parallel, where one side (top surface in the figure) of the unit is covered by the first covering body 3a or 3b and the other side (bottom surface in the figure) of each aligned optical fiber is integrally covered by the second covering body 5. This optical fiber structure is structured in such a way that the second covering body 5 that covers the two optical fiber units is split into two at the center to create branches extending into two directions. In other words, the four-core optical fiber structure is split between two optical fibers 2b and 2c to form two two-core optical fiber branches.

In an optical fiber structure having the above branching structure conforming to the present invention, it is desirable to adopt a structure for storing/retaining the optical fibers at each branching section using an affixing member, in order to prevent further branching of the optical fiber unit, or specifically further tearing of the second covering body. FIGS. 8 through 12 each provide a perspective view of an optical fiber structure adopting such storage/retention structure.

Figure 8:
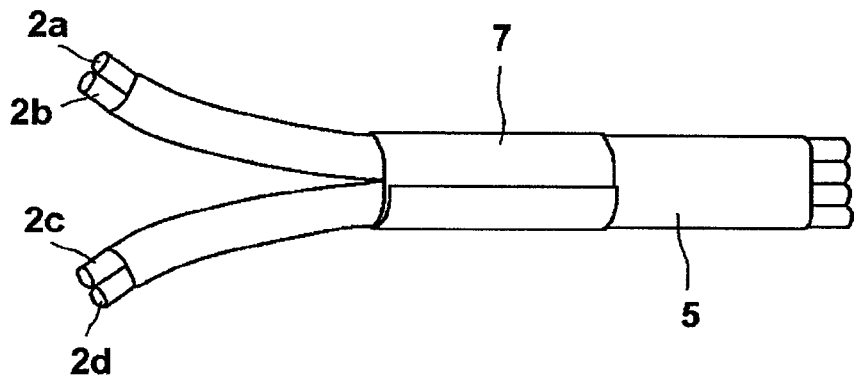
FIG. 8 provides a perspective view of another example of the optical fiber structure proposed by the present invention.
Figure 9:
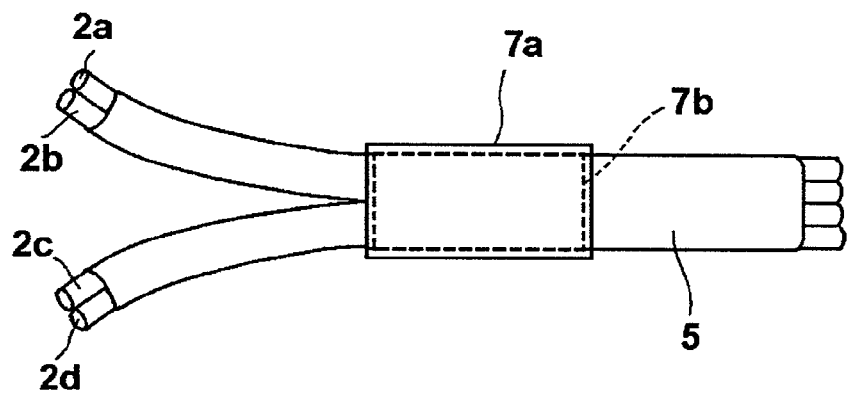
FIG. 9 provides a perspective view of another example of the optical fiber structure proposed by the present invention.
Figure 10:
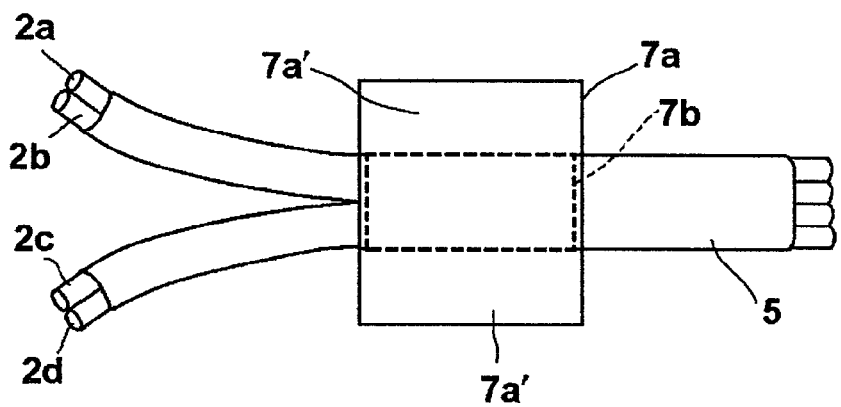
FIG. 10 provides a perspective view of another example of the optical fiber structure proposed by the present invention.

For example, the branching end of the optical fiber structure can be wrapped by one adhesive sheet 7 to bond and affix the branching structure so that the optical fiber unit will not branch further, as shown in FIG. 8. This way, further tearing of the second covering body 5 can be prevented. Also, the branching end can be sandwiched between two adhesive sheets 7a and 7b to bond and affix the branching structure, as shown in FIG. 9. If two adhesive sheets are used, one adhesive sheet can be formed larger than the other sheet, as shown in FIG. 10. In this case, the unattached excess area 7a' of the larger adhesive sheet can be used to attach the optical fiber structure to another device, thereby affixing the branching-end position within the device. Here, it is desirable that a removable film coated with release agent be attached to the adhesive layer in the excess area 7a' before the sheet is attached.

Figure 11:
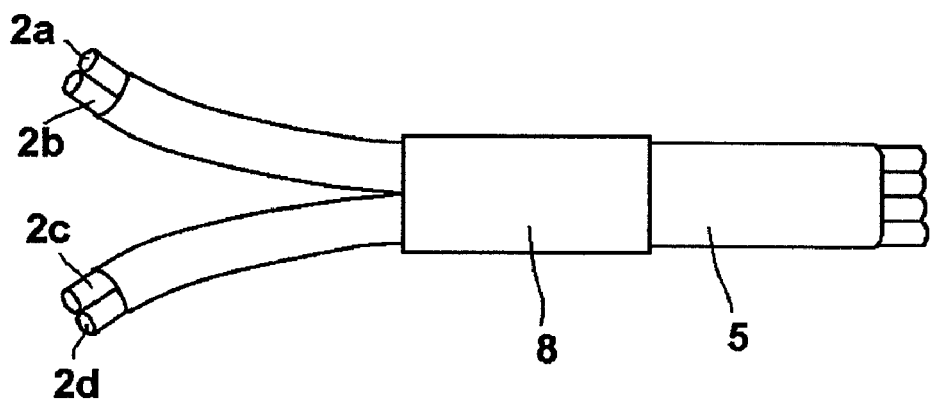
FIG. 11 provides a perspective view of another example of the optical fiber structure proposed by the present invention.

As shown in FIG. 11, the branching end of the optical fiber structure can be covered by resin 8 having a tensile strength higher than that of the second covering body. If resin is used as an affixing member, the flexible forming property of resin enables designing of a desired covering shape according to the required specification, thereby increasing the production efficiency.

Figure 12:
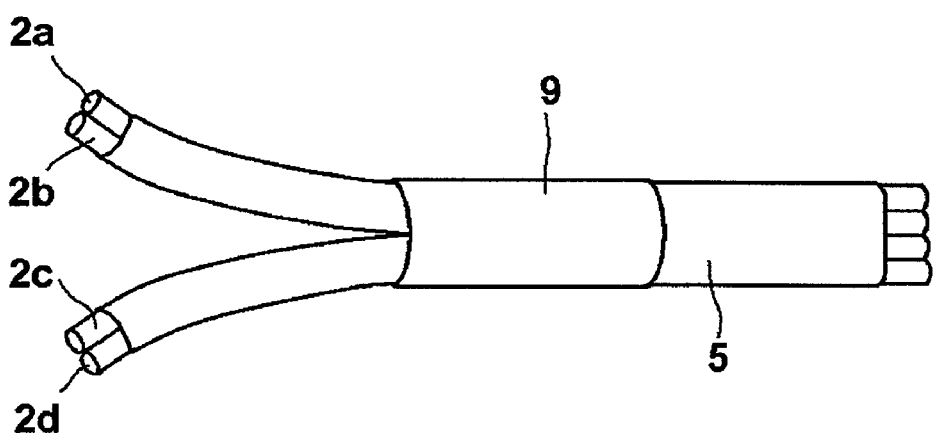
FIG. 12 provides a perspective view of another example of the optical fiber structure proposed by the present invention.
Figure 13:
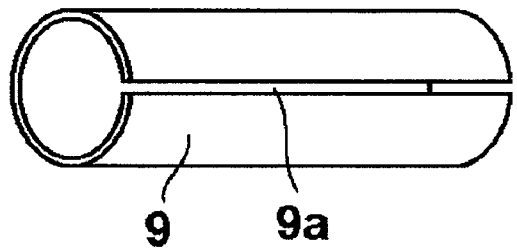
FIG. 13 provides a perspective view of an affixing member.

Furthermore, it is also possible to tear the second covering body 5 of the optical fiber structure to a desired potion, and then store the optical fiber structure in the cavity of a tubular affixing member 9, after which the tubular affixing member can be shrunk at the branching position of the optical fibers to affix the branching section of the optical fiber structure, as shown in FIG. 12. The tubular affixing member used here can have any shape, such as circle or oval, as long as the member does not break upon contact with an optical fiber or other component. Also, an affixing member 9 having a slit 9a can be used to facilitate the insertion of the optical fiber structure into the cavity, as shown in FIG. 13.

Figure 14:
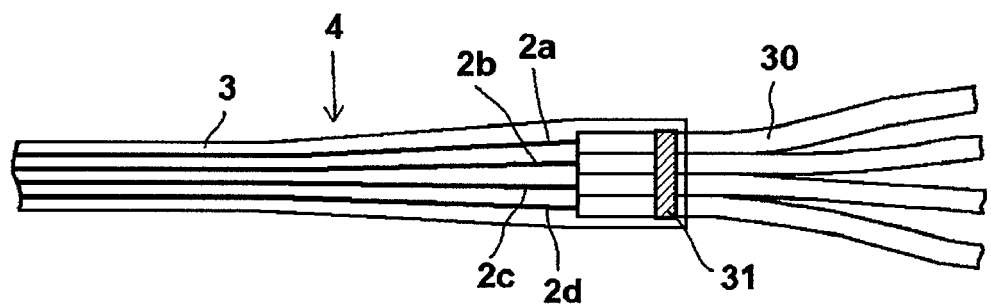
FIG. 14 provides a schematic view illustrating the end part of an optical fiber structure conforming to the present invention, where the end is branched into a group of single optical fibers.

In addition, the optical fiber structure proposed by the present invention permits the optical fibers to be branched into single optical fibers to form a group of single optical fibers at the end of the optical fiber structure. In this case, each branched, single optical fiber should preferably be guided through a cylindrical tube. FIG. 14 shows one example of forming a group of single optical fibers at one end of a branched, four-core optical fiber unit 4 that constitutes an optical fiber structure conforming to the present invention. At the end of the optical fiber unit comprising four optical fibers 2 covered by the first covering body 3, each optical fiber is branched into single optical fibers 2a-2d and each branched single optical fiber is separately guided through a cylindrical tube 30. Here, numeral 31 is a binding member used to bind the multiple cylindrical tubes through which the optical fibers are guided.

The above cylindrical tube 30 and binding member 31 are not always necessary, but provision of both is preferred in order to prevent application of unnecessary side pressure on the optical fibers in the case of the cylindrical tube 30, and to retain the single optical fibers in a bundled state in the case of the binding member 31. The material of the cylindrical tube is not specifically limited, but a cylindrical tube made of plastic material such as polyethylene or polypropylene can be used favorably. If the outer diameter of the optical fiber is 250 μm, the inner diameter of the cylindrical tube should preferably be 300 μm or more, but not exceeding 1 mm. If the inner diameter of the cylindrical tube is smaller than 300 μm, the optical fibers cannot be guided easily. If the inner diameter exceeds 1 mm, on the other hand, the branched optical fiber cord itself becomes bulky and the flexibility is lost. The binding member used in the present invention may be made of paper, plastic or metal, but aluminum tape can be used favorably. The tape width should preferably be 3 mm or more, but not exceeding 10 mm. If the tape width is smaller than 3 mm, the operability drops and sufficient strength cannot be ensured. If the tape width exceeds 10 mm, on the other hand, the increase in material cost outweighs the benefit of higher strength.

Figure 15:
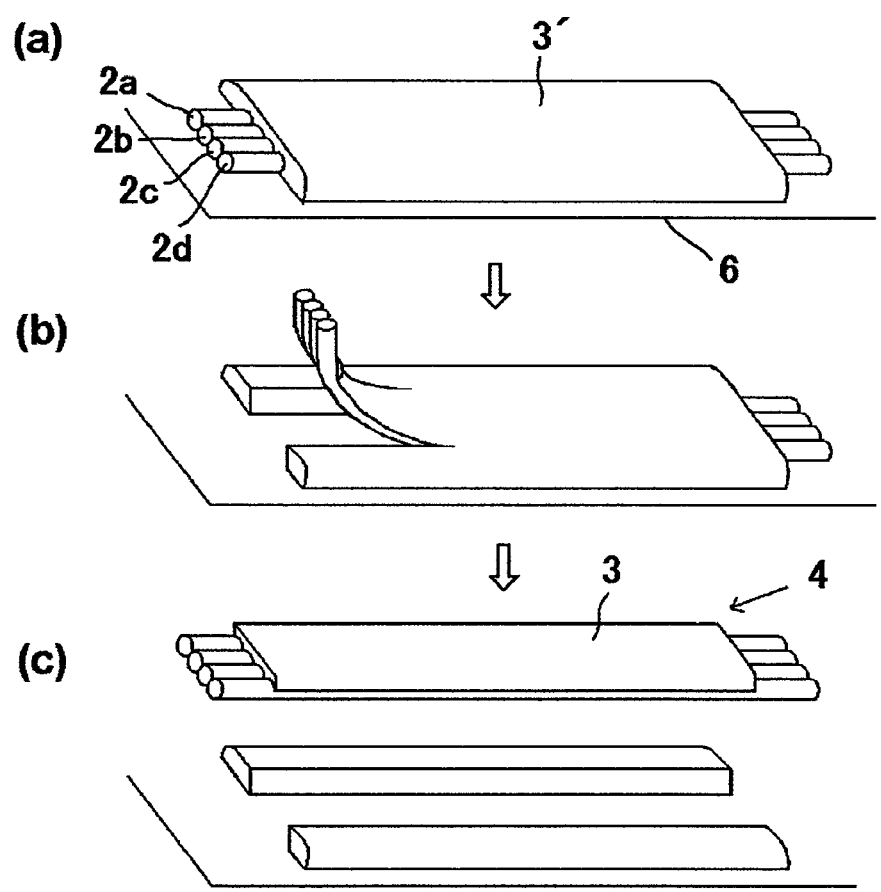
FIG. 15 provides a process chart illustrating one example of manufacturing an optical fiber unit used in the optical fiber structure proposed by the present invention.
Figure 16:
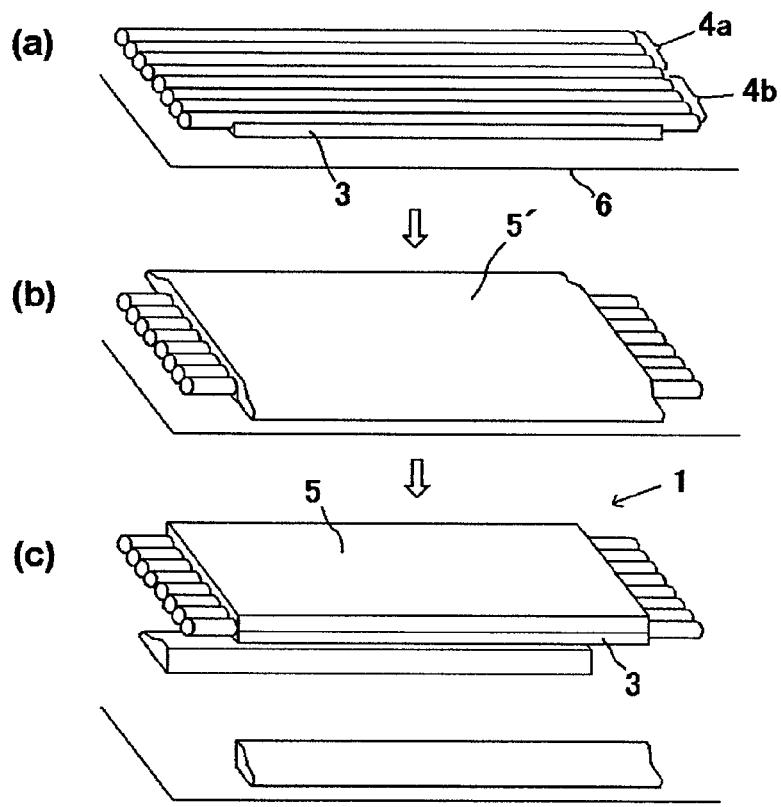
FIG. 16 provides a process chart for manufacturing one example of the optical fiber structure proposed by the present invention.

Next, the method of manufacturing optical fiber structure proposed by the present invention is explained. First, the method of manufacturing the optical fiber structure in the first embodiment where the optical fibers are aligned in parallel is explained. FIG. 15 provides a process chart for producing an optical fiber unit used in the present invention, while FIG. 16 provides a process chart for manufacturing an eight-core optical fiber structure using optical fiber units produced in accordance with FIG. 15. First, four optical fibers 2a-2d are aligned in parallel and placed on a two-dimensional board 6, and then a covering material 3' for forming a first covering body is applied and cured in order to cover a desired range of the optical fibers aligned on the board (FIG. 15(a)). Next, the optical fibers 2a-2d are separated from the board 6 in an aligned condition, to produce an optical fiber unit 4 whose optical fibers are covered by the first covering body 3 (FIG. 15(b), FIG. 15(c)).

Next, two optical fiber units 4a and 4b, produced in the manner explained above, are turned upside down, and then aligned and placed on the board 6 so that their uncovered surfaces face up (FIG. 16(a)). Then, a covering material 5' for forming a second covering body is applied and cured on top so that a desired range of the optical fibers is covered (FIG. 16(b)). Next, the two optical fiber units are separated from the board in an aligned condition, to manufacture an optical fiber structure 1 comprising two optical fiber units integrally covered by the second covering body 5 (FIG. 16(c)).

The above explained the manufacture of an eight-core optical fiber structure comprising two optical fiber units whose uncovered surfaces are covered integrally by the second covering body. However, an optical fiber structure comprising optical fiber units whose covered surfaces are covered integrally by the second covering body can also be manufactured in accordance with the above method.

Also, the number of optical fibers is not at all limited, and a supermulti-core optical fiber structure having 20 or more cores, as shown in FIG. 3, can be easily manufactured using the above operation, or specifically by aligning in parallel a group of optical fiber units having the first covering body, and then applying the covering material for forming the second covering body.

How to manufacture the optical fiber structure in the second embodiment, in which the alignment order of optical fibers is changed in each optical fiber unit, is explained below by using FIG. 5 as an example. First, two optical fibers are aligned in parallel and placed two-dimensionally. Then, at the optical fiber rewiring part the optical fibers are crossed to rearrange the optical fibers. Next, the two-dimensionally placed optical fibers are coated with the covering material for forming the first covering body, the covering material is cured using an appropriate curing means, and then the optical fibers are peeled off from the board to produce an optical fiber unit whose optical fibers are covered by the first covering body. Next, the two optical fiber units 4a and 4b are turned upside down and aligned without leaving any gaps in between, and then the covering material for forming the second covering body is applied over the top surface and cured to manufacture an optical fiber structure whose two optical fiber units are integrally covered by the second covering body.

How to manufacture the optical fiber structure in the third embodiment, in which the alignment order of optical fiber units is changed, is explained below using FIG. 6 as an example. Two optical fiber units 4a and 4b, produced in accordance with the process per FIG. 15 above, are aligned in parallel and placed two-dimensionally so that the uncovered surfaces of optical fibers face up. Then, the optical fiber units are crossed at a desired optical fiber rewiring position to rearrange the optical fibers. Next, the two-dimensionally placed optical fibers are coated with the covering material for forming the second covering body, and then the covering material is cured using an appropriate curing means to produce an optical fiber unit whose two optical fibers are integrally covered by the second covering body 5. In the optical fiber structures in both the second and third embodiments explained above, the number of optical fibers is not at all limited, and an optical fiber structure having any number of optical fibers can be manufactured in the same manner. Also, the number of optical fiber units is not limited to two, either.

Figure 17:
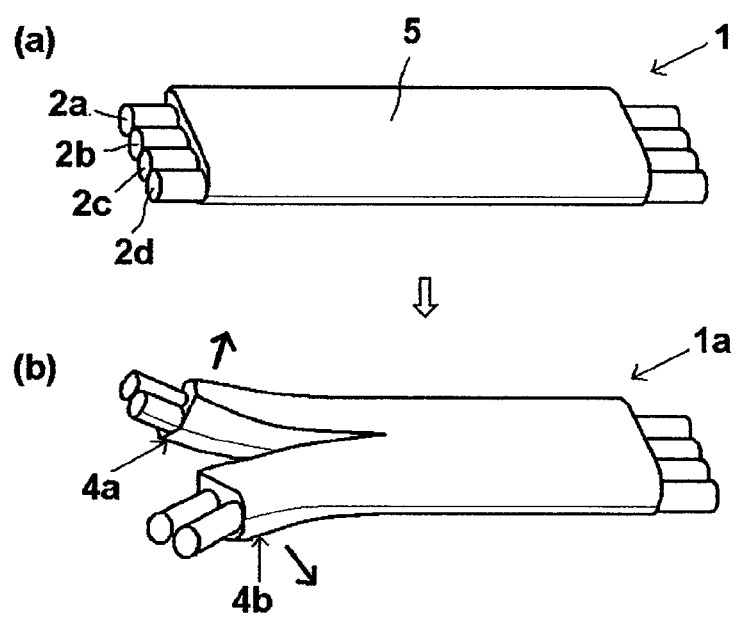
FIG. 17 provides a process chart for manufacturing another example of the optical fiber structure proposed by the present invention.

Furthermore, the optical fiber structure in the fourth embodiment, characterized by a branching structure in which multiple optical fiber units are partially branched, can be manufactured as follows, for example. First, a four-core optical fiber structure is manufactured in the same manner as explained in FIGS. 15 and 16. Then, an optical fiber structure is manufactured in accordance with the process chart shown in FIG. 17. Specifically, while holding the ends of the optical fiber units 4a and 4b constituting the four-core optical fiber structure 1, respectively, the optical fiber units are moved reciprocally in a manner tearing them in the axial direction of optical fibers, in order to tear the second covering body 5 between the optical fiber units 4a and 4b (FIG. 17(a) and FIG. 17(b)). This way, a four-core optical fiber structure 1a with two branching pairs of optical fibers can be produced. The speed at which the optical fiber units are moved reciprocally in a manner tearing them in the axial direction of optical fibers, as well as the angle formed by one bundle of optical fibers with the other bundle, are not specifically limited and should be set in such a way that the shape of the split part of the optical fiber units as a result of movement does not become uneven and that the second covering body can be torn properly. To achieve a uniform cover shape, however, the moving speed of optical fibers during the branching process should preferably be kept constant. Incidentally, the reciprocal movement of optical fibers at the time of tearing may be a movement of the two sides in a manner separating from each other in either the horizontal direction or vertical direction.

According to the above manufacturing method proposed by the present invention, the branching structure of the optical fiber structure can be formed by holding the ends of the two optical fiber units to be branched, and then moving them reciprocally in opposite directions in order to tear the optical fiber units to a desired point along the axial direction of optical fibers. Therefore, the branching structure can be formed efficiently without having to use a separation tool to branch the optical fibers. Also, the optical fibers can be branched without using any cutting tool or other tool if the covering material explained later is used, which reduces the production facility costs and also improves safety. Furthermore, the tearing length can be set freely by adjusting the moving distance of the optical fibers held.

If the target optical fiber structure is to have a branching structure, an affixing member can be used to store/retain the optical fibers at the branching section, as explained earlier. If a tubular affixing member is used, various methods can be used to affix the member to the optical fiber structure, such as shrinking the affixing member by means of the elasticity of rubber or shrinking it using heat, ultraviolet light, electric heating wire, etc.

In the case of the optical fiber structure having a branching structure as explained in the fourth embodiment, the number of optical fibers is not at all limited, and the interval between each adjacent pair of optical fibers can be set as deemed appropriate for the specification of the optical fiber structure to be manufactured.

Figure 18:
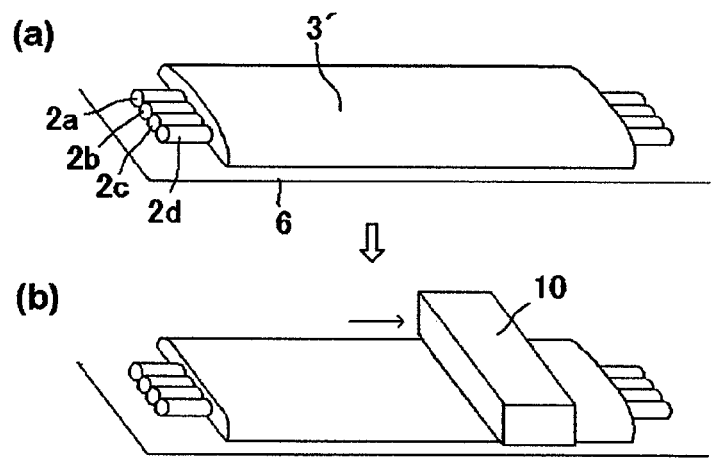
FIG. 18 provides a process chart explaining how to form covering bodies.

When manufacturing an optical fiber structure in conformance with the present invention, in the step where two-dimensionally aligned optical fibers are covered by the covering material should be implemented in such a way to form a layer of the covering material to a desired thickness over the surface of optical fibers, and the covering method or forming method used in this process is not at all limited. For example, the first covering body and/or second covering body may be formed using a forming jig. FIG. 18 provides a process chart showing an example of this implementation. First, the covering material is applied over optical fibers 2a-2d aligned two-dimensionally on a board 6. Next, a forming jig 10 is moved from the forming start position to the forming end position to adjust the thickness of the covering material 3' over the optical fiber surface by means of the bottom surface of the forming jig 10.

Figure 19:
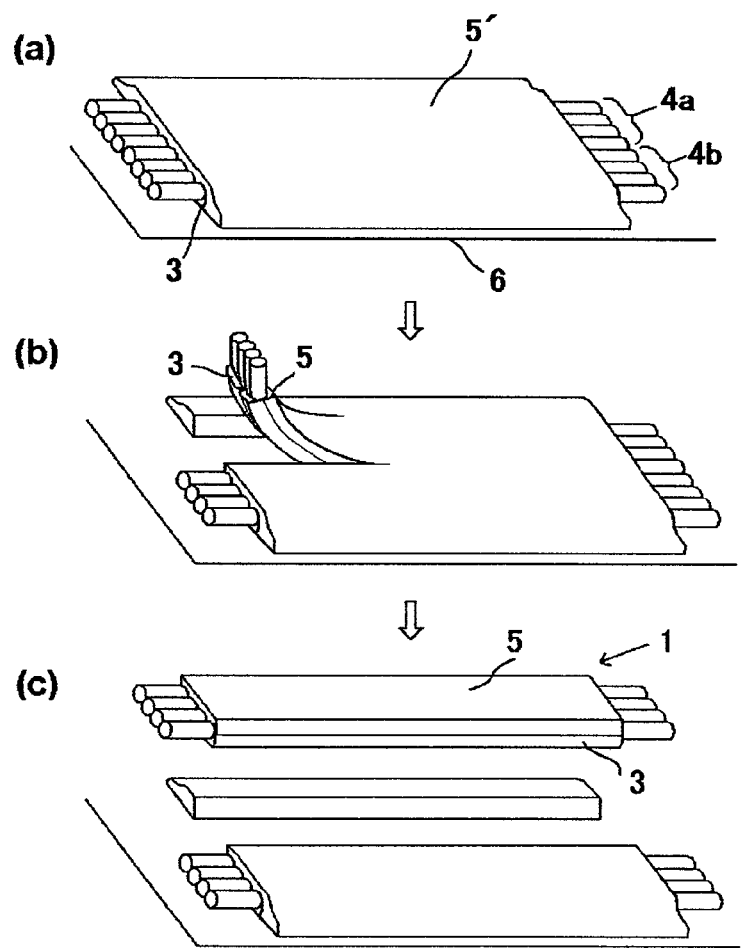
FIG. 19 provides a process chart for manufacturing yet another example of the optical fiber structure proposed by the present invention.

It is also possible, for example, to apply the covering material over the two-dimensional plane of a board on which multiple optical fiber units are placed, and then peel of the optical fibers partially from the two-dimensional plane to form an optical fiber structure. It is also possible to form another optical fiber structure by peeling off other optical fibers. FIG. 19 shows the process of doing this. In FIG. 19, two optical fiber units 4a and 4b covered by the first covering body 3 are placed in parallel on a board 6, and then a covering material 5' for forming the second covering body is applied (FIG. 19(a)), after which one optical fiber unit is peeled off (FIG. 19(b)) to form an optical fiber structure covered by the second covering body 5 (FIG. 19(c)).

Next, materials that are used to comprise the optical fiber structure proposed by the present invention are explained.

The covering materials for forming the first covering body and second covering body used in the present invention are not specifically limited as long as the manufacturing method of the present invention can be applied, but materials that form an easy-to-tear covering body are desired. In particular, covering materials that form a covering body having a tearing strength of 29 kgf/cm or below are preferred. If the tearing strength exceeds 29 kg/cm, the high tearing resistance reduces the operability, and the requirement for a large tearing load may cause the formed covering body to crack or chip. More specifically, covering materials that form a covering body with a tearing strength of 10 kgf/cm or below can be favorably used. Incidentally, "tearing strength" refers to the strength measured by testing in conformance with JIS K 6250 (General Examples of Physical Test Methods for Vulcanized Rubber and Thermoplastic Rubber) and JIS K 6252 (Tearing Test Method for Vulcanized Rubber), or specifically the strength measured by pulling an angled test piece having a narrow rectangular slit, and then measuring the stress at which the slit starts to expand in order to obtain the maximum tearing strength.

The covering materials for forming the first covering body and second covering body used in the present invention should desirably have good adhesion to the outermost covering material of optical fibers. In addition, they should preferably have good flexibility to improve the ease of handling of the optical fiber structure. Examples of covering materials that satisfy the above conditions include rubber-like resin materials, flexible thermosetting or ultraviolet setting resins, and flexible thermoplastic resins. In particular, silicone resin and butyl rubber can be used favorably. Among the various types of silicone resin and butyl rubber, silicone rubber has a small tearing strength because the intermolecular attractive force of the Si—O bond is small, and thus the material can be torn easily from edges. Also, silicone rubber has excellent flexibility owing to the rubber's elasticity, and also provides good elongation and tensile strength. Therefore, silicone rubber can effectively comply with the movements of the optical fibers to be covered, while exhibiting strong resistance to tearing forces received by the optical fibers in their intermediate sections. In other words, silicone rubber helps create a fan-out optical fiber structure that can be easily branched from edges in the production process. If the branched end is subsequently affixed using an affixing member, such optical fiber structure also exhibits strong resistance to tearing forces while in use. On the other hand, the siloxane bond offers excellent heat resistance, which translates to excellent heat-resistance retention property and excellent adhesive force at high and low temperatures. If silicone rubber is used as a wiring member, therefore, such wiring member does not deteriorate but keeps the optical fibers in a stably affixed state in either a high-temperature environment (up to 250° C.) or low-temperature environment (down to −50° C.). Also, silicon rubber exhibits excellent electrical insulation property, chemical resistance, weather resistance and water resistance, and by using a primer as necessary it can be bonded to a wide range of materials. For example, silicone rubber can adhere to plastic fibers formed by fluororesin or optical fibers whose cladding layer is coated with fluororesin. From the viewpoint of simplicity of use, room-temperature vulcanization (RTV) silicone rubber whose curing reaction progresses at room temperature is preferred among the various types of silicone rubber. In addition, the silicone rubber used should preferably be of addition-reaction vulcanization type, condensation-reaction vulcanization type, or one-component type where all necessary components are filled in a single sealed container such as tube or cartridge and offered as an easy-to-use product package.

In the optical fiber structure proposed by the present invention, the first covering body and second covering body should preferably be made of the same covering material. By using the same covering material, tearing and peeling between the first covering body and second covering body can be prevented and the manufacturing efficiency also improves. Since the first covering body and second covering body have the same tearing strength, if silicone rubber is used as the material the optical fibers in an optical fiber unit can be branched easily.

The optical fiber used in the proposed invention is not at all limited, and any type of optical fiber can be selected as deemed appropriate for the required application, etc. For example, an optical fiber made of quartz, plastic or other material can be used in a multiple mode or single mode. The outer diameter and length of such optical fiber are not at all limited, either. Furthermore, the optical fiber may be branched and the length of the branched optical fiber may be cut to adjust the length, or the optical fiber may be straightened, partially deformed or processed in any desired manner. Also, the optical fiber constituting the optical fiber structure proposed by the present invention may have a part of the optical fiber between its input end and output end missing, if necessary.

In addition, under the present invention the number of optical fibers in the optical fiber structure is not specifically limited and can be set freely as deemed appropriate. However, the number of optical fibers in the optical fiber structure should preferably be a multiple of four for various reasons. For example, an optical fiber structure covered on one side and free from variation would be manufactured more easily, the optical fiber structure must have sufficient strength, and many conventional coated optical fiber ribbons have optical fibers in a quantity corresponding to a multiple of four.

If an optical fiber structure conforming to the present invention is to be designed with a branching structure, any of the materials mentioned above can be used for its affixing member. The tubular affixing member may be made of any plastic, metal, rubber, etc., but the material should preferably be as light as possible.

If resin is used to make the affixing member, the material resin used to store/protect the optical fibers is not specifically limited, as long as the material has a tearing strength higher than the tearing strength of the covering materials that cover the optical fibers. Nevertheless, rubber-like resin materials, thermosetting resins, ultraviolet setting resins, electron-beam setting resins and other setting resins are cited as preferred materials. To be more specific, rubber-like resin materials include silicone rubber, urethane rubber, fluororubber, acrylic rubber, ethylene-acrylic rubber and chloroprene rubber. To improve the ease of handling of the optical fiber structure, the material should preferably have flexibility as well. Flexible setting resins include epoxy resins, ultraviolet setting adhesives and silicone resins. All thermoplastic resins can be used as long as they are flexible, such as polyvinyl acetate, ethyl methacrylate and other resins that constitute hot-melt adhesives. In particular, hot-melt adhesives can be used effectively in the present invention, because they are not sticky at room temperature, cause no pollution, have no toxicity, and present no fire hazard.

If, under the present invention, any optical fiber is to be branched into single optical fibers at the end of any optical fiber unit, each branched optical fiber may be inserted into a cylindrical tube for protection. The material of this cylindrical tube is not specifically limited, but a cylindrical tube made of polyethylene, polypropylene or other plastic can be favorably used. If the outer diameter of the optical fiber is 250 μm, the inner diameter of the cylindrical tube should preferably be 300 μm or more, but not exceeding 1 mm. If the inner diameter of the cylindrical tube is less than 300 μm, insertion of the optical fiber becomes difficult. If the inner diameter exceeds 1 mm, on the other hand, the branched optical fiber cord itself becomes bulky and the flexibility is lost. The binding member used to bind the cylindrical tubes may be made of paper, plastic or metal, but aluminum tape can be used favorably. The tape width should preferably be 3 mm or more, but not exceeding 10 mm. If the tape width is smaller than 3 mm, the operability drops and sufficient strength cannot be ensured. If the tape width exceeds 10 mm, on the other hand, the increase in material cost outweighs the benefit of higher strength.

The present invention is explained below using examples. It should be noted, however, that the present invention is not at all limited to these examples.

EXAMPLES

Example 1

Figure 20:
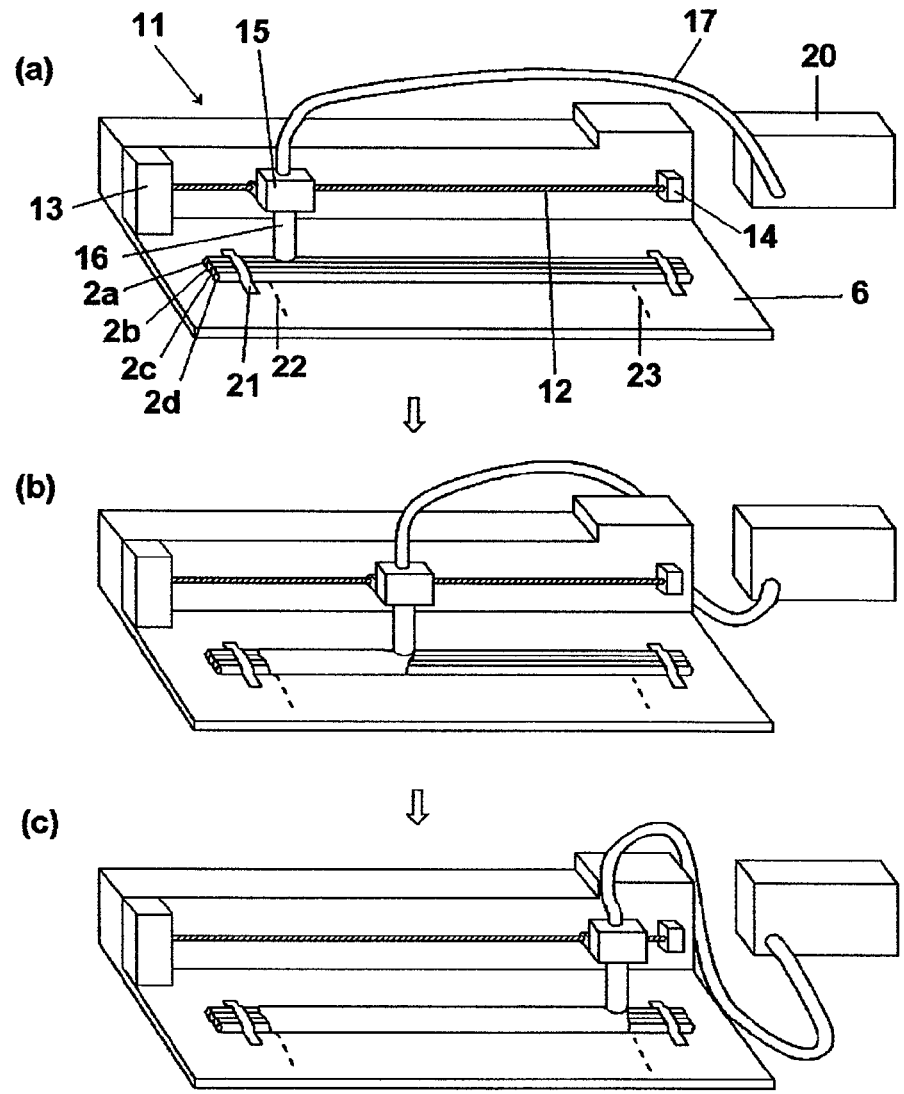
FIG. 20 provides a process chart for manufacturing the optical fiber structure given in Example 1.

The applicator shown in FIG. 20 was used to produce an optical fiber structure. This applicator comprised a single-axis control robot 11 and a material feeding apparatus 20, where the single-axis control robot had a board 6 on which to place optical fibers. A ball screw shaft 12 was placed along the longitudinal direction, and a drive motor 13 was provided at one end. The other end was supported by means of a bearing 14, and the ball bearing was screw-connected to a movable unit 15. This movable unit had a needle 16 for supplying material placed vertically to the stage surface. The needle was connected to the material feeding apparatus by a flexible rubber tube 17.

First, as shown in FIG. 20(a), four 30-cm long optical fibers 2a-2d (quartz single-mode fiber by Sumitomo Electric Industries; outer diameter 0.25 mm) were aligned in parallel on a board, and affixed with adhesive tape 21 near the ends. The needle (with an inner diameter of 1 mm) was affixed to the movable unit so that the height of its tip became 0.1 mm from the optical fiber surface, and the needle was then moved to the application start position 22 from which to start covering the aligned optical fibers, to adjust the needle center with the center of the four optical fibers. Then, by moving the needle to the application end position 23 in the axial direction of optical fibers (refer to FIG. 20(b) and FIG.(c)), a covering material for forming the first covering body was applied over the top surface of the optical fibers. The optical fibers were moved manually with respect to the board, and ultraviolet setting resin (Viscotac PM-654 by Osaka Organic Chemical Industry) was used as the covering material for covering the optical fibers. A dispenser was used as the material feeding apparatus for supplying the covering material.

Next, an ultraviolet irradiator was used to cure the covering material by means of ultraviolet irradiation (irradiated for 10 seconds at an irradiation intensity of 20 mW/cm$^2$). The process was repeated to prepare four one-side covered optical fiber units, each having its one side covered by the first covering body. Then, the four one-side covered optical fiber units were turned upside down so that the surfaces without covering material faced top, and the units were aligned in parallel on a single plane and both ends were affixed using adhesive tape. The same covering material mentioned above was applied integrally over these four one-side covered optical fiber units and cured by means of ultraviolet irradiation to form the second covering body. The needle had a diameter of 4 mm, and was set in such a way that the needle height became 0.1 mm from the optical fiber surface.

The optical fiber structures produced as above could be installed in a minimum unit quantity. Since the covering material between the optical fiber units was minimal, the optical fiber units could be split simply by splitting the second covering body applied only on one side. The splitting resistance was small, and the optical fiber units could also be split accurately to the branching position, so the operability improved as a result. The optical fiber splitting position could also be checked by an undulation on the covered side, which also contributed to good operability. Furthermore, this optical fiber structure could be manufactured simply by splitting the optical fibers, without contaminating the surrounding environment.

Example 2

An eight-core, 1-m long optical fiber structure was produced using the same manufacturing method described in Example 1, except that thermosetting silicone rubber resin (TSE392 by GE Toshiba Silicone; tearing strength 5 kgf/cm) was used as the covering material for optical fibers on both sides. The covering material was cured by heating with a dryer for 1 hour using hot air of 120° C.

The optical fiber structure produced in this example exhibited excellent flexibility owing to the silicone rubber used as the covering material for aligned optical fibers, as well as good operability as a result of the bending flexibility during handling.

Example 3

Twenty optical fiber units produced using the same method described in Example 1 were aligned in parallel to produce an eighty-core, 1-m long optical fiber structure in the same manner as in Example 1. Both the first covering body and second covering body were formed using room-temperature vulcanization silicone rubber (SE9186L by Toray Dow Corning).

Example 4

A four-core fiber structure was produced using optical fiber units whose alignment order of optical fibers was changed, as shown in FIG. 5. First, two optical fibers with a length of 1 m were aligned on a polyimide film having a size of 3 mm×40 mm and thickness of 125 μm and on which an adhesive layer of 100 μm in film thickness was formed, and then the optical fibers were rearranged to make them cross with each other at the center, after which the optical fibers were affixed and then covered using the same method and material described in Example 2. The process was repeated to prepare two optical fiber units, each with its original alignment order of optical fibers changed. Next, these optical fiber units were aligned and placed with their uncovered surfaces facing up, and the same covering material mentioned above was applied over the optical fibers and cured to produce an optical fiber structure covered by the first covering body and second covering body.

The optical fiber structure produced in this example could be wired in accordance with the I/O port of any applicable device, because the alignment order of optical fibers could be changed freely by causing the optical fibers to cross at the rewiring part of optical fibers. Accordingly, there was no need, unlike with conventional coated optical fiber ribbons, to separate individual optical fibers and rearrange their wiring in accordance with the I/O ports of the applicable device. At the part where the optical fibers were aligned, the optical fibers were aligned and affixed without any gaps in between, and thus the width could be kept to a level equivalent to the widths of conventional coated optical fiber ribbons and the resulting wiring configuration was as compact as any configurations made with conventional coated optical fiber ribbons.

Example 5

Figure 21:
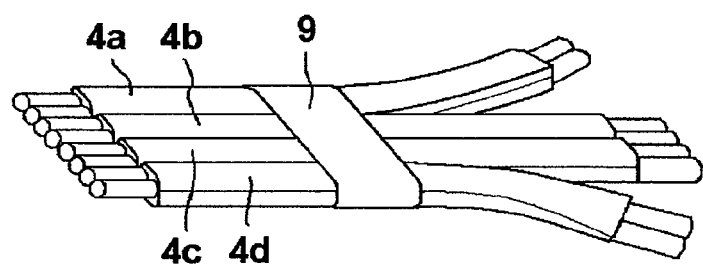
FIG. 21 provides a perspective view of the optical fiber structure given in Example 5.

An eight-core optical fiber structure shown in FIG. 21, where the optical fibers on both sides were branched into two-core segments, was produced. First, two-core optical fiber units 4a-4d, one side of which was covered by the first covering body, were aligned in parallel and placed two-dimensionally with their uncovered surfaces facing up. Then, a covering material was applied over these optical fiber units and cured in the same manner as in Example 3 to produce an optical fiber structure covered by the first covering body and second covering body. Next, an affixing member 9 made of a thermoshrinkable silicone rubber shrink tube (product name: Sparon by Nikkan Industries; inner diameter 1.5 mm) was prepared, and the branching section of the optical fibers constituting the obtained optical fiber structure was inserted into the tube, after which the tube was shrunk by heating it for 5 minutes with a heater to affix the branching end of optical fibers. Next, the optical fiber units 4a and 4d on both ends of the optical fiber structure were torn and branched from the adjacent optical fiber units so that the optical fiber units were torn between 4a and 4b, and between 4c and 4d. This way, an eight-core optical fiber structure with a thickness of 0.4 mm and width of 1.1 mm, and having its two-core optical fiber units on both ends branched by 10 cm, was formed.

Example 6

An optical fiber structure having the alignment order of its two-core optical fiber units changed, as shown in FIG. 6, was produced. First, two optical fiber units having one side of their two optical fibers covered by the first covering body were placed and aligned on a board so that their uncovered surfaces of optical fibers faced up. Then, the optical fiber units were crossed at the optical fiber rewiring part to change the alignment order of optical fiber units. Then, the same covering material used in Example 2 was applied to a total thickness of 1 mm and then cured to form the second covering body to produce an optical fiber structure conforming to the present invention.

Example 7

Figure 22:
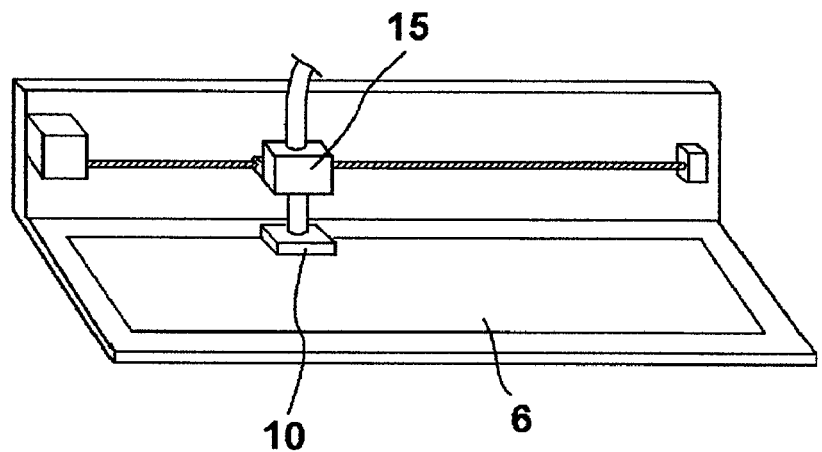
FIG. 22 provides a perspective view of an applicator used in the manufacturing method proposed by the present invention.

First, four 300-mm long optical fibers (quartz single-mode optical fiber by Furukawa Electric; outer diameter 0.25 mm) were used to produce optical fiber units using the applicator shown in FIG. 22. The applicator had a forming jig 10, which was similar to what is shown in FIG. 20, attached to a movable unit 15. The forming jig 10 had a width of 40 mm, length of 30 mm and height of 40 mm, was flat at the bottom, and was installed vertically to the movable unit 15 in the direction vertical to the board. Because of this structure, the forming jig could be moved up and down and to right and left using the movable unit 15.

First, the four optical fibers were aligned on a board 6 placed on the applicator, and a covering material was discharged from the discharge outlet over the aligned optical fibers to coat the optical fibers. The application of the covering material and movement of the optical fibers with respect to the board were done manually, and room-temperature setting silicone rubber (product name: SE9186L by Toray Dow Corning Silicone) was used as the covering material. After the covering material was applied over one side of the optical fibers, the covering material was fully cured for 1 hour at room temperature to obtain an optical fiber unit covered by the first covering body. While the thickness of the first covering body could be controlled by controlling the vertical position of the movable unit, in this example the first covering body was applied in such a way that it covered the optical fibers to the tangential line common to the four circles defining the outer profiles of the four optical fibers.

Next, the obtained four optical fiber units were aligned in parallel with their surfaces covered by the first covering body facing the same direction, and the four optical fiber units were integrally covered by the second covering body by applying the covering material over the first covering body. The second covering body also used room-temperature setting silicone rubber (product name: SE9186L by Toray Dow Corning Silicone). The vertical position of the movable unit was controlled to adjust the thickness of the cover layer to 100 µm. Thereafter, the covering body was fully cured for 1 hour at room temperature to obtain an optical fiber unit covered by the second covering body (refer to FIG. 4).

The first covering body and second covering body of the obtained optical fiber structure had a uniform thickness, respectively, and the optical fiber structure exhibited good flexibility. This manufacturing method allowed the optical fibers and optical fiber structures to be aligned and operated on a plane, without having to switch jigs after increasing or decreasing the number of optical fibers or changing other condition, unlike under conventional manufacturing methods, and it was also possible to apply the coating material continuously. Therefore, the process was simple and efficient, and resulted in lower manufacturing costs.

Example 8

Figure 23:
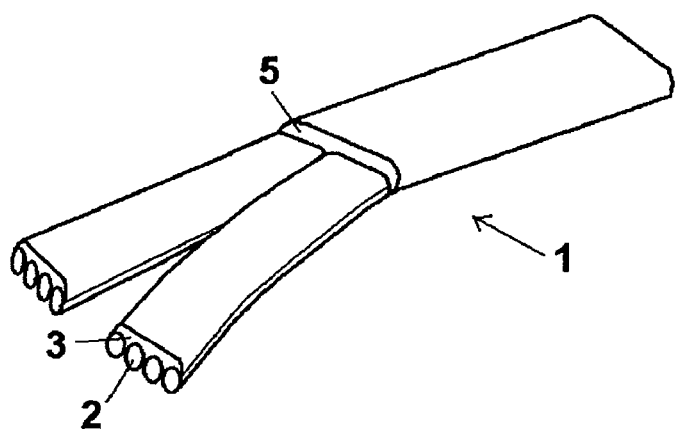
FIG. 23 provides a perspective view of the optical fiber structure given in Example 8.

An optical fiber structure was produced in the same manner as in Example 7, using two optical fiber units each having four optical fibers produced per Example 7. However, the second covering body 5 applied over the first covering body 3 was coated in such a way that it did not cover the entire length of the optical fibers 2, but covered only a half the length or 150 mm, as shown in FIG. 23. The material of the second covering body was the same as the one used in Example 1. The produced optical fiber structure 1 provided an eight-core branching coated optical fiber ribbon that could be branched into two four-optical fibers. By using the method of manufacturing optical fiber structure proposed by the present invention, optical fiber structures that not only branch into two, but also into three, four or any other number of branches can be manufactured with ease.

Example 9

Nine optical fiber units, each having eight optical fibers, were produced in the same manner as in Example 7, and these nine optical fiber units were aligned in parallel so that their surfaces covered by the first covering body faced the same direction, after which the first covering bodies were covered by the second covering body in the same manner as in Example 1. The first covering body and second covering body used the same material specified in Example 7. The first covering body and second covering body of the obtained 72-core optical fiber structure had a uniform thickness, respectively, and the optical fiber structure exhibited good flexibility. Traditionally, controlling the alignment of optical fibers became particularly complex when the number of optical fibers increased. On the contrary, however, this manufacturing method allowed the optical fibers and optical fiber units to be aligned and operated on a plane with the same degree of simplicity associated with a small number of optical fibers even when the number of optical fibers was increased, and it was also possible to apply the coating material continuously. Therefore, the process was simple and efficient, and resulted in lower manufacturing costs.

Example 10

Figure 24:
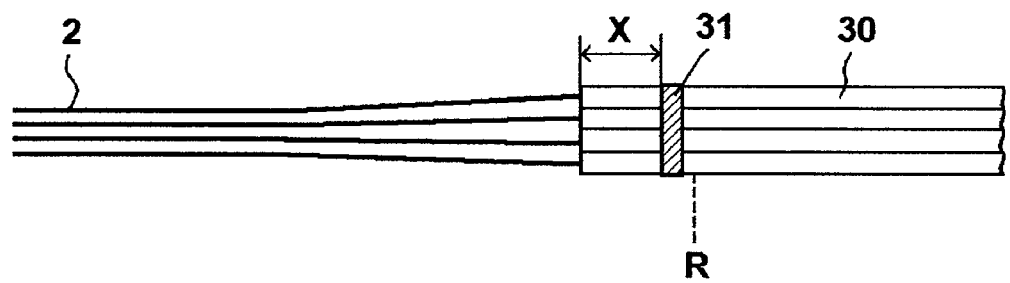
FIG. 24 provides a drawing explaining the condition in Example 10 in which multiple optical fibers are aligned.
Figure 25:
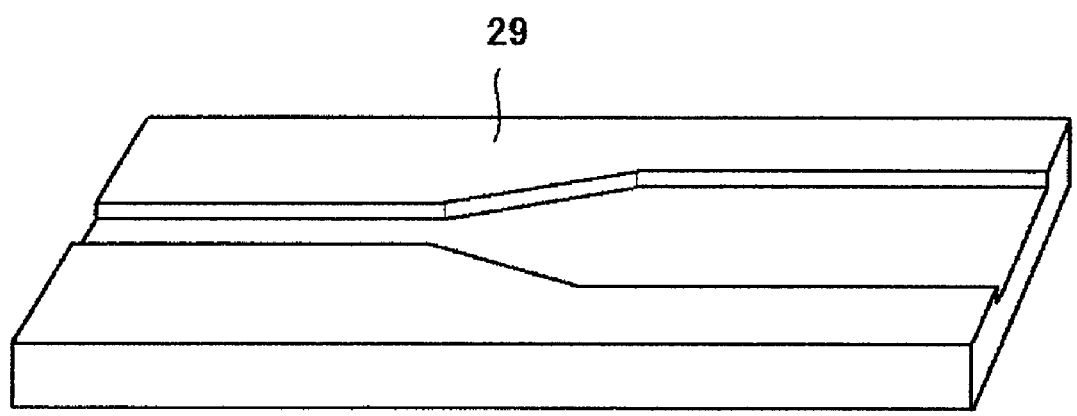
FIG. 25 provides a perspective view of the alignment member used in Example 10.

An optical fiber branch cord was produced using four 2,000-mm long optical fibers (quartz single-mode optical fibers by Furukawa Electric; outer diameter 0.25 mm). To be specific, first the four optical fibers were each guided through a polyethylene cylindrical tube 30 having an inner diameter of 0.4 mm, outer diameter of 0.9 mm, and length of 300 mm, in such a way that the two ends of the optical fibers projected from the tubes by 100 mm on one end, and by 1,600 mm on the other end (refer to FIG. 24). Then, an aluminum tape of 3 mm in width (binding member 31) was wrapped around the cylindrical tubes at 10 mm from their ends (X=10 mm in FIG. 24), to bundle the cylindrical rubes. Next, the four optical fibers guided through the cylindrical tubes were aligned as shown in FIG. 24 using a grooved alignment member 29 as shown in FIG. 25, after which a covering material was applied to the position indicated by R in the same manner as in Example 1 above to produce an optical fiber unit covered by the first covering body. The above process was repeated to produce two optical fiber units, and the second covering body was formed in the same manner as in Example 1 to produce an optical fiber structure having its optical fiber units branching into single optical fibers at their ends.

In the present disclosure where conditions and/or structures are not specified, the skilled artisan in the art can readily provide such conditions and/or structures, in view of the present disclosure, as a matter of routine experimentation.

The present application claims priority to Japanese Patent Application No. 2005-82922, filed Mar. 23, 2005, No. 2005-82923, filed Mar. 23, 2005, and No. 2005-94177, filed Mar. 29, 2005, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical fiber structure comprising:
   A plurality of optical fibers that are aligned two-dimensionally, wherein said plurality of optical fibers are divided into multiple optical fiber units comprising two or more optical fibers;
   each of said multiple optical fiber units having only one surface thereof being covered by a first covering body, such that the first covering body each of said multiple optical fiber units is separated from the first covering body of an adjacent optical fiber unit by a groove and the covered surfaces of each of said multiple optical fiber units face the same direction; and
   the covered or uncovered surfaces of said plurality of optical fibers being integrally covered by a second covering body.

2. The optical fiber structure according to claim 1, wherein the second covering body that covers the plurality of optical fibers has a tearing strength of 29 kgf/cm or below.

3. The optical fiber structure according to claim 1, characterized in that the first covering body and the second covering body are made of the same type or different types of silicone rubber.

4. The optical fiber structure according to claim 1, characterized in that the alignment order of the optical fiber units is changed.

5. The optical fiber structure according to claim 4, characterized in that the alignment order of the optical fiber core wires is changed in the optical fiber units.

6. The optical fiber structure according to claim 1, characterized in that the alignment order of the optical fiber core wires is changed in the multiple optical fiber units.

7. The optical fiber structure according to claim 1, characterized in that at least one of the multiple optical fiber units is branched.

8. The optical fiber structure according to claim 7, characterized in that the branching section of the branched optical fiber unit is affixed by means of an affixing member.

9. The optical fiber structure according to claim 1, characterized in that a group of single optical fiber core wires comprising single core wires branching from said multiple optical fiber units are formed at the end of the optical fiber structure.

10. The optical fiber structure according to claim 9, characterized in that each of the branched single optical fiber core wires is guided through a cylindrical tube and said cylindrical tube is affixed at the end of the optical fiber structure.

11. A method of manufacturing optical fiber structure comprising:
   dividing a plurality of optical fibers into multiple optical fiber units consisting of two or more optical fibers, each of said multiple optical fiber units comprising multiple optical fiber core wires that are aligned;
   covering only one surface of each of said multiple optical fiber units by a first covering body;
   separating the first covering body of each of said multiple optical fiber units from the first covering body of an adjacent optical fiber unit with a groove;
   aligning said multiple optical fiber units and placing said multiple optical fiber units on a plane so that the covered surfaces face the same direction; and
   covering the covered or uncovered surfaces of the plurality of optical fibers integrally by a second covering body, to integrate the multiple optical fiber units.

12. The method of manufacturing optical fiber structure according to claim 11, characterized in that the second covering body that covers the plurality of optical fibers has a tearing strength of 29 kgf/cm or below.

13. The method of manufacturing optical fiber structure according to claim 11, characterized in that the first covering body and the second covering body are made of the same type or different types of silicone rubber.

14. The method of manufacturing optical fiber structure according to claim 11, characterized in that, in the step in which the multiple optical fiber units are aligned and placed so that the covered surfaces face the same direction, the alignment order of the multiple optical fiber units is rearranged and placed in such a way that the multiple optical fiber units are at least partially crossed.

15. The method of manufacturing optical fiber structure according to claim 14, characterized in that the multiple optical fiber core wires in one or more of the optical fiber units are partially crossed and aligned in a different alignment order.

16. The method of manufacturing optical fiber structure according to claim 11, characterized in that the multiple optical fiber core wires in one or more of the multiple optical fiber units are partially crossed and aligned in a different alignment order.

17. The method of manufacturing optical fiber structure according to claim 11, characterized in that the covered or uncovered surfaces of the multiple optical fiber units are covered by the second covering body, and then said multiple optical fiber units are partially torn and branched.

18. The method of manufacturing optical fiber structure according to claim 17, characterized in that, after the multiple optical fiber units are partially torn and branched, the branching section of the branched optical fiber units are affixed by means of an affixing member.

19. The method of manufacturing optical fiber structure according to claim 11, characterized in that a group of single optical fiber core wires comprising single core wires branching from optical fiber core wires are formed at the end of the optical fiber unit.

20. The method of manufacturing optical fiber structure according to claim 19, characterized in that each of the branched single optical fiber core wires is guided through a cylindrical tube.

* * * * *

UNITED STATES PATENT AND TRADEMARK OFFICE
CERTIFICATE OF CORRECTION

PATENT NO. : 7,509,009 B2
APPLICATION NO. : 11/372472
DATED : March 24, 2009
INVENTOR(S) : Masayoshi Suzuki, Kyoichi Sasaki and Ken Sukegawa It is certified that error appears in the above-identified patent and that said Letters Patent is hereby corrected as shown below:

Column 4, Line 16 (Approx), after "member" insert --.--.

Column 10, Line 41, change "29 Kg/cm," to --29 Kgf/cm,--.

Column 17, Line 26, change "A" to --a--.

Signed and Sealed this

Fifteenth Day of December, 2009

David J. Kappos
*Director of the United States Patent and Trademark Office*